Dec. 12, 1939.  W. A. FRANTZ  2,183,310
OPERATING HANDLE FOR ELECTRICALLY DRIVEN TOOLS
Filed March 26, 1937    2 Sheets-Sheet 1
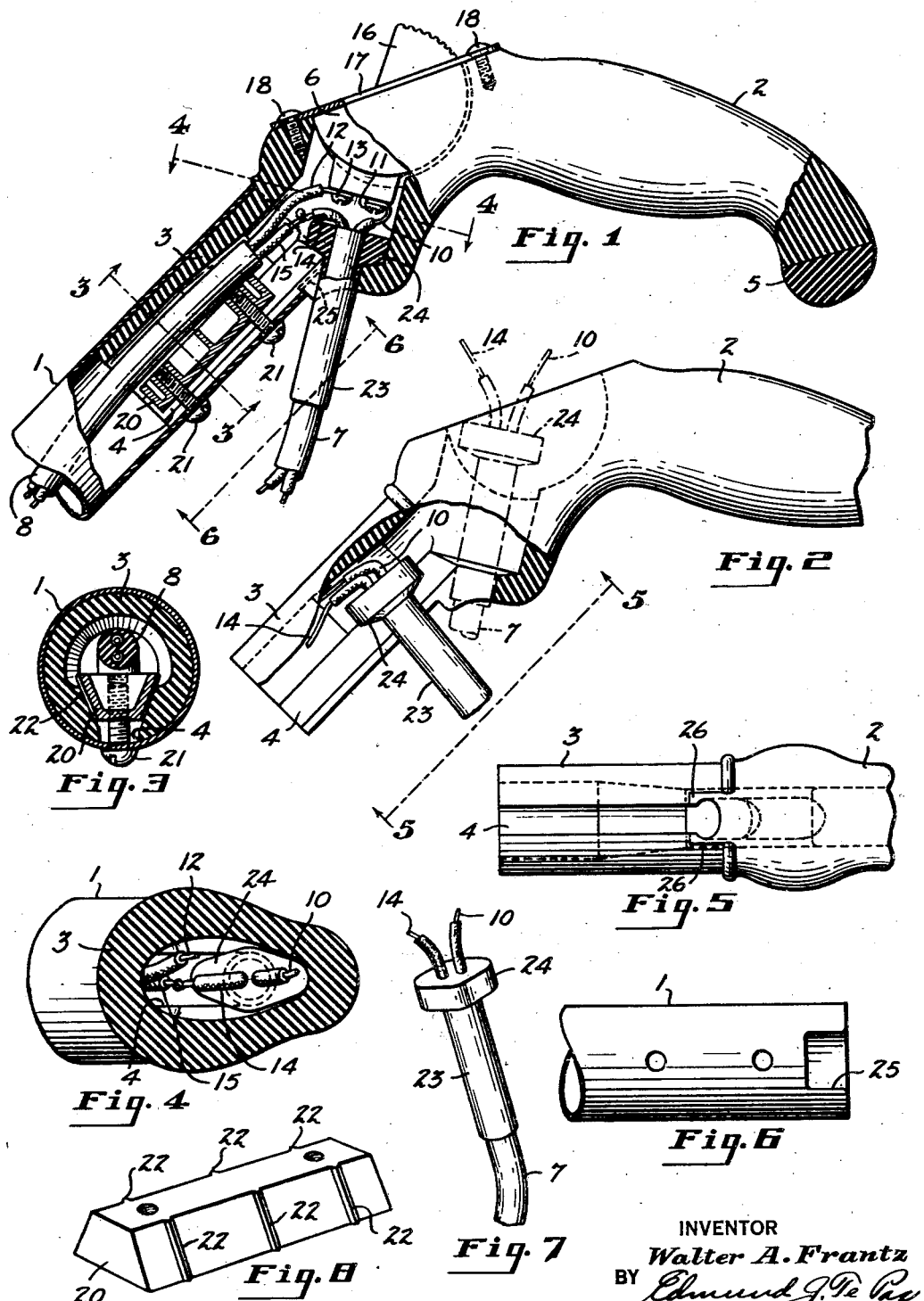
INVENTOR
Walter A. Frantz
BY
his ATTORNEY Dec. 12, 1939.  W. A. FRANTZ  2,183,310
OPERATING HANDLE FOR ELECTRICALLY DRIVEN TOOLS
Filed March 26, 1937  2 Sheets-Sheet 2
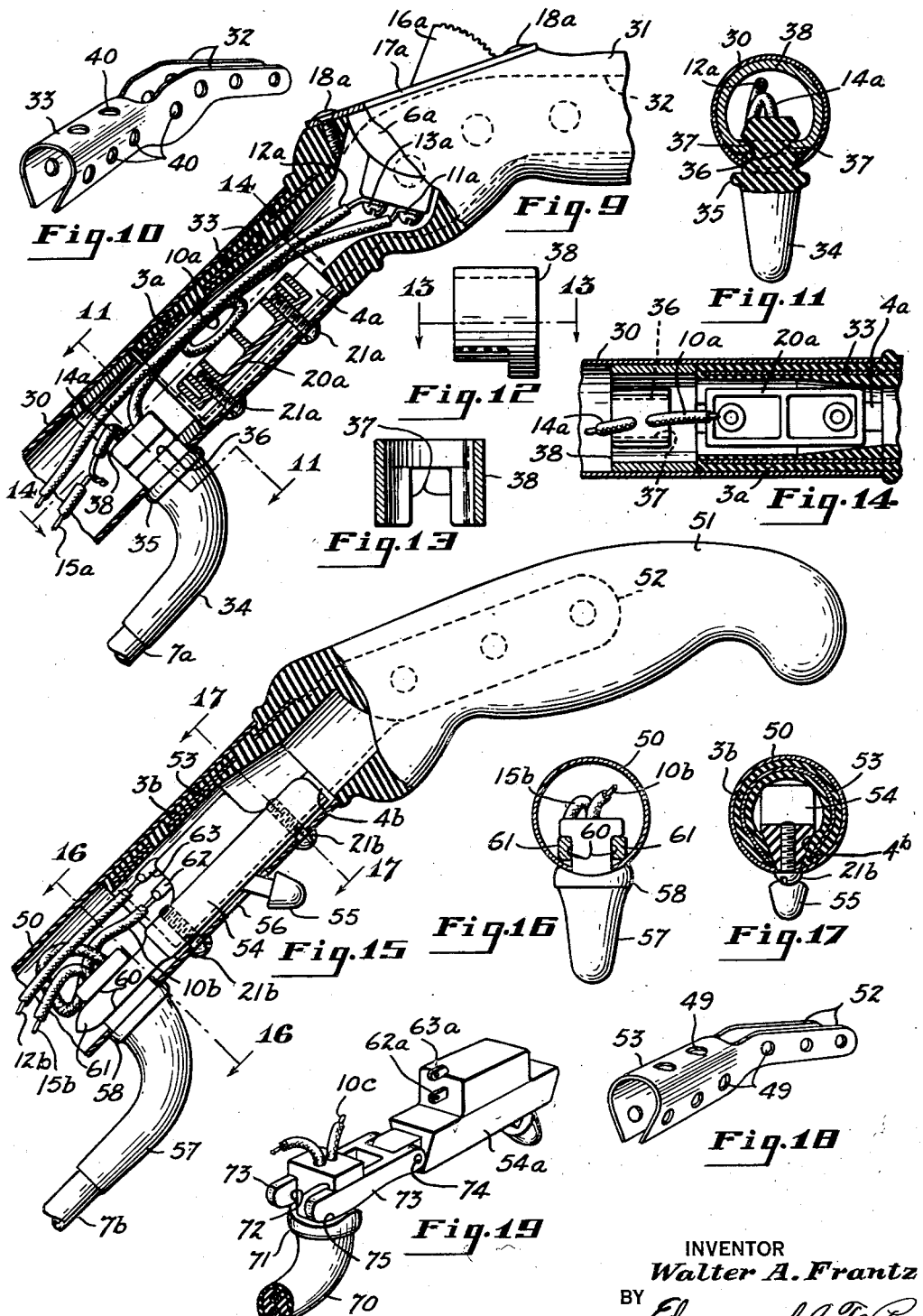
INVENTOR
Walter A. Frantz
BY
his ATTORNEY Patented Dec. 12, 1939

2,183,310

UNITED STATES PATENT OFFICE 2,183,310

OPERATING HANDLE FOR ELECTRICALLY DRIVEN TOOLS

Walter A. Frantz, Shaker Heights, Ohio, assignor to The Apex Electrical Manufacturing Company, Cleveland, Ohio, a corporation of Ohio Application March 26, 1937, Serial No. 133,287

6 Claims. (Cl. 200—157)

This invention relates to a tool handle and in particular to an operating handle for an electrically-driven tool.

In its preferred form, the handle structure to which this invention relates, comprises a hollow shaft or handle tube portion and an associated hand grip portion which is preferably made from an electrically non-conducting material. The shaft portion and hand grip portion are of hollow construction to provide space for the accommodation of electrical conductors and an associated switch and also for the accommodation of an improved means for securing the hand grip to the tube and for anchoring an electrical supply cord to the handle.

The invention has for its objects the provision of a handle of the type described having improved means for securely attaching the hand grip to the shaft of the handle; the provision of improved means for relieving strain on the electrical conductors; the provision of means for facilitating the assembly of the handle parts and the installation of the switch and associated electrical conductors; the provision of a means for strengthening and reinforcing the hand grip of the handle; and the provision of a handle of the type described employing a relatively few number of parts which are simple and inexpensive to manufacture and which are provided with ample strength for the service for which they are intended, the parts of the handle being arranged so that they may be assembled or disassembled without difficulty by a relatively unskilled person in the art to which this invention relates.

These and other objects of the invention will become more apparent and better understood after consideration has been given to the following detailed description of the invention taken in connection with the drawings which show, merely by way of illustration, structure adapted for carrying out the objects of the invention.

In the drawings, Figure 1 is a side elevational view, partly in section, of a handle structure illustrating one form of the invention; Figure 2 is a similar view of the hand grip of the handle, illustrating the manner in which the electrical conductors are inserted in place in this member; Figures 3 and 4 are sectional views taken on line 3—3 and 4—4 respectively of Figure 1; Figure 5 is a plan view of the underside of the hand grip taken in a direction indicated by the lines 5—5, Figure 2; Figure 6 is a side elevational view illustrating the details of the handle tube; Figure 7 is a detail perspective view showing the strain relief which is provided for the electrical supply cord; Figure 8 is an enlarged detail perspective view of the spreader or wedge for expanding a portion of the hand grip inside the tubular part of the handle; Figure 9 is a side elevational view, partly in section, of a modified form of handle construction; Figure 10 is a perspective view of a metal reinforcing member which is used in connection with the handle shown in Figure 9; Figure 11 is a sectional view taken on line 11—11, Figure 9; Figure 12 is a detail side elevational view of one of the elements of the handle shown in Figure 9 by means of which the electrical supply cord is held in place in the handle; Figure 13 is a sectional view taken on line 13—13, Figure 12; Figure 14 is a sectional view taken on line 14—14, Figure 9; Figure 15 is a side elevational view, partly in section, of a handle structure illustrating yet another modification of the invention; Figures 16 and 17 are sectional views taken on lines 16—16 and 17—17 respectively of Figure 15; Figure 18 is a detail perspective view of the reinforcing element which is used in connection with the handle shown in Figure 15; and Figure 19 is a perspective view of a modification of the switch and strain relief of the handle shown in Figure 15.

The handle to which this invention relates is intended to be used in connection with a manually operable, electrically-driven tool, as for example, a suction cleaner. In the form of the invention illustrated in Figures 1 to 8, the handle comprises a handle tube 1 and a hand grip or pistol grip 2 having at one end a cylindrical portion 3 which is slotted at 4 and adapted for reception into the end of the handle tube. The hand grip is preferably formed from an electrically non-conducting material, as for example, hard rubber, and the end 5 of the hand grip remote from the tube 1 is formed from a piece of soft rubber which forms an integral part of the rest of the hand grip.

A portion of the hand grip is hollowed out for receiving an electric switch 6, the end of an electric current supply cable 7 and the end of a second electric cable 8. The strand 10 of the cable 7 is connected to one of the contacts of the switch 6 by means of a screw 11 and the strand 12 of the cable 8 is connected by means of a screw 13 to the other terminal of the switch 6. The strand 14 of the cable 7 and the strand 15 of the cable 8 are connected directly to each other.

The top part of the hand grip 2 has an opening through which there projects an operating member 16 for the switch 6. The switch 6 is secured in place in the hand grip by means of a plate 17 fastened to the hand grip by means of screws or rivets 18, 18.

The slotted portion 4 of the hand grip is engaged by a wedge 20 with suitable threaded openings for receiving screws 21, 21 by means of which the wedge may be forced downwardly against the sloping sides of the slotted portion 4 of the hand grip to expand the same inside of the handle tube 1 and thus securely cause the hand grip to engage the tube. The sloping sides of the wedge 20 are each provided with a plurality of ribs 22. The wedge may be formed from a piece of die-cast metal and as the hand grip is formed from a relatively softer material, the ribs of the wedge will dig into the hand grip when the wedge is tightened and thus further insure to hold the hand grip fixedly in place in the tube 1 when the screws 21 are tightened.

A sleeve 23 having an enlarged end 24 which is non-circular or oval-shaped in cross-section, is vulcanized to the end of the cord 7. The hand grip is provided with a suitable recess for the seating of the enlarged end 24 of the sleeve 23 and the said enlargement constitutes a strain relief for the cord 7 and the sleeve portion 23 thereof serves to strengthen and reinforce the cord at this point where it is subject to considerable strain and bending during the operation of the device to which the handle is attached.

The assembly of the handle may be readily effected without difficulty. In accomplishing this, the strain relief of the supply cord 7 is inserted in the hand grip by way of the slotted portion thereof in the manner suggested in Figure 2 of the drawings. When the strain relief is in the dotted line position shown in Figure 2 of the drawings, the cord 8 may be withdrawn a slight distance from the handle tube 1 and the end inserted in the slotted end of the hand grip portion so that the ends of the strands of the cable 8 project from the hand grip alongside of the strands of the supply cable 7.

The strands 14 and 15 of the cables 7 and 8 respectively are then joined to each other and the strands 10 and 12 of the cables 7 and 8 respectively are then attached to the switch 6 whereupon the switch may be fastened in place in the handle by means of the screws 18. The wedge 20 may then be inserted in the slotted portion 4 of the hand grip and the latter is then inserted into the end of the tube 1 whereupon the screws 21 may be inserted into the wedge and when they are tightened, they serve to expand the slotted end of the hand grip and securely hold the same in place in the end of the tube.

A portion of the end of the tube is cut out at 25 for receiving the squared portion 26 at the underside of the hand grip and by means of this arrangement, twisting of the handle in the tube is effectively prevented and at the same time the screws 21 are relieved of all strains which might be caused by a twisting of the hand grip in the handle tube.

In the modification of the invention illustrated in Figures 9 to 14, the handle comprises a tube 30 and a hand grip or pistol grip 31 which may be of molded construction and formed from an electrically non-conducting material. A switch 6a having an operating member 16a is secured to the hand grip by means of a plate 17a and screws 18a similar to the corresponding elements previously described. A metal reinforcing member is embedded in the handle 31. This member includes portions 32 which extend into the portion of the grip which is engaged by the hand and it also includes another portion 33 which is embedded in a part of the hand grip which is expanded by means of a wedge 20a similar to the one previously described.

Screws 21a are provided for forcing the wedge 20a against the sloping sides of the slotted portion 4a of the reduced section 3a of the hand grip which is received in the end of the tube 30. The electrical supply cord 7a is fitted with a strain relief comprising a sleeve portion 34 with an enlarged end 35. The enlarged end of the strain relief is grooved at 36 and it is engaged thereat by the sides 37 of the notched portion of a collar or ring 38 which is fitted in the tube 30.

The strand 14a of the cable 7a is connected to the strand 15a of the cable which is housed within the tube 30 and the latter cable has a strand 12a which is connected to the switch 6a by means of the screw 13a. The other strand 10a of the cable 7a is connected to the switch 6a by means of a screw 11a. Perforations 40 are formed in the metal reinforcing member to provide for the flow of the material of the hand grip when it is molded so that the said member is completely embedded and surrounded by the material of the hand grip.

In assembling the structure shown in Figures 9 to 14, the strand 15a of the cable inside the handle is withdrawn or caused to project from the opening in the tube 30 which is provided at its underside for reception of the supply cord 7a. The strands 14a and 15a are first joined to each other and then the strain relief is inserted in place in the stated opening which is provided for it at the underside of the tube 30.

The collar 38 and the end portion 3a of the hand grip 31 is then inserted into the end of the open tube 30 with the wedge 20a in position inside the hand grip and when the sides 37 of the notched end of the collar 38 have been moved into engagement with the grooved portion 36 of the strain relief of the cord 7a, the screws 21a of the wedge 20a may be inserted and tightened. The switch 6a may now be connected to the conductor strands 10a and 12a whereupon the switch is inserted in the hand grip and fastened in place.

It is, of course, to be understood that the strands 10a and 12a are to be of sufficient length so as to permit the withdrawal of the switch 6a without disturbing the rest of the handle or requiring the disconnection of the switch from these conductor strands. The interior of the hand grip is provided with sufficient space to accommodate the extra amount of wire which is necessary to permit effecting the aforesaid operation.

The modification of the invention illustrated in Figures 15 to 19 comprises a handle tube 50 and a hand grip 51 which are somewhat similar to the corresponding elements previously described. The hand grip 51 is provided with a reinforcing element having portions 52 embedded inside the portion of the hand grip which is engaged by the hand of the operator and another portion 53 which is embedded in a reduced end portion 3b of the hand grip. The portion 3b of the hand grip is slotted at 4b for reception of the housing 54 of a switch structure, the operating handle 55 of which projects through a suitable opening 56 at the underside of the handle tube 50. This reinforcing element is also formed with perforations 49 for insuring flow of the material of the grip completely about the element when the grip is molded.

The switch housing 54 constitutes a wedge which functions substantially the same as the wedges previously described. Screws 21b are provided for causing the said wedge to expand the slotted reduced end section 3b of the hand grip and thus to cause the same to tightly grip the handle tube.

An electric cord 7b having conductor strands 10b and 15b is anchored to the handle by means of a strain relief somewhat similar to the one previously described. In the present form of the invention, the strain relief comprises a sleeve portion 57 and an enlarged end portion 58, which is received in a suitable opening formed in the handle tube 50. The end portion of the strain relief is formed with channeled sides 60 which are embraced by the arms 61 which form a bifurcated end portion or extension of the switch housing 54 and they serve to hold the strain relief and the associated cord 7b in place.

The strain relief in the present instance is formed by vulcanizing the same to the end of the cord, as in the case of the previously described strain reliefs. The strand 12a of the cord which is received within the tube 50 and the strand 10b of the supply cord 7b are connected at 62 and 63 respectively to terminal members of the switch which is located within the housing 54.

In assembling the handle structure shown in Figure 15, the strand 15b of the supply cable 7b is first connected to one of the strands (not shown) of the cable which is carried in the tube 50. The end of the cable 7b about which the strain relief is fitted, is then inserted in the opening which is provided for its reception at the underside of the handle 50.

The strand 10b of the supply cable 7b and the strand 12b of the cable inside the tube 50 are of sufficient length so that they may be extended beyond the open end of the tube 50 and after these strands have been connected to the terminals 62 and 63 of the switch which is located in the housing 54, the switch is then inserted in the tube with its arms 61 engaging the enlarged end of the strain relief of the cord 7b.

The reduced end portion 3b of the hand grip 51 is then inserted into the end of the tube 50 and the screws 21b are then applied and when they have been tightened, the switch housing 54 will wedge the end 3b of the hand grip inside the end of the tube 50, in much the same manner as for the handles previously described.

The operating member or trigger of the switch is preferably arranged so that it may be unscrewed from the structure of the switch which is carried in the switch housing 54. After the tube 50 and hand grip 51 have been assembled and secured to each other, the operating member or trigger 55 may be inserted in place in the switch.

The handle hand grips 31 and 51 are preferably made from a softer rubber composition than is used in making the hand grip 2 shown in the first modification of the invention. In the modifications of the invention shown in Figures 9 and 15, it is not necessary that the material from which the hand grip portion is formed, possess the same mechanical strength as the hand grip illustrated in Figure 1 because the metal reinforcing members which are used in connection with the latter two modifications of the invention will serve to strengthen and reinforce the latter hand grips. It is, of course, understood that a metal reinforcing member similar to those shown in Figures 10 and 18 could be used in the hand grip 2, if desired.

By reason of this arrangement, the use of a soft rubber tip, such as indicated at 5 in Figure 1, is not necessary in the hand grips 31 and 51 because these grips when cured or vulcanized, are sufficiently resilient or yielding so that they will not scratch or mark articles of furniture against which they may come in contact during the operation of the device to which the handle is attached. The use of softer rubber composition has the additional advantage of greatly reducing the cost of the hand grip because soft rubber articles may be cured in a much shorter time than is required for the curing of a hard rubber article.

Figure 19 illustrates a modification of the means which are provided for holding the strain relief in place in the handle tube 50 of the form of the invention shown in Figure 15. This modification includes a switch housing 54a. A suitable switch structure located within the housing 54a is provided with terminals 62a and 63a for connecting the contacts of the switch to suitable conductors, one of which may be the strand 10b of the supply cable similar to the cable 7b. The end of such cable may be provided with a strain relief in the form of a tubular portion 70 having an enlargement 71, channeled at 72 for receiving the arms 73 of a forked member which is pivoted at 74 to the switch housing 54a.

The lower edges 75 of the arms 73 of the forked member are of curved configuration and when the arms 73 of the forked member are moved into engagement with the strain relief, the same will be tilted downwardly a slight amount and the curved edges of the arm 73 will contact with the inner side of the tube 50 and thus securely anchor the strain relief to the handle.

The foregoing description and the accompanying drawings to which it relates, describes what might be termed the preferred modes of practicing the invention. It is to be clearly understood, however, that the invention includes each and every novel feature or combination of novel features herein disclosed, subject only to the restrictions of the prior art, and that the invention may assume other forms and it is not to be limited to the particular and specific structure shown and described herein.

Having thus described my invention what I claim is:

1. A handle for an electrically-operated tool comprising, a handle tube, a hand grip with a hollow interior portion and an end portion slotted along one side and adapted to be received in said tube, and means adapted to be received in the hollow interior of said hand grip including an electric cord insertable in the handle grip by way of the slotted portion thereof and a switch structure operatively connected to said cord for expanding the slotted portion of said hand grip for the purpose of causing the same to tightly engage said handle tube.

2. A handle for an electrically-operated tool comprising, a handle tube, a hand grip with a hollow interior portion and an end portion slotted along one side and adapted to be received in said tube, and means adapted to be received in the hollow interior of said hand grip including an electric cord insertable in the handle grip by way of the slotted portion thereof, a switch operatively connected to said cord and means including a housing for said switch for expanding the slotted portion of said hand grip for the purpose of causing the same to tightly engage said handle tube.

3. An operating handle for an electrically driven tool comprising, a handle tube and an associated hand grip having a portion which is received in the end of said tube, said hand grip having a hollow portion and three openings communicating with such hollow portion, one opening being in the end of the hand grip which is received in said handle tube, another opening being at the underside of the hand grip and the third opening being at the top of the hand grip above said last-named opening, a switch in said hand grip having an operating member projecting from the opening located in the top of the hand grip, means for securing said hand grip to said tube, an electric cord operatively connected to said switch and extending through said first two openings, and a strain relief integral with the cord for anchoring the cord in the opening at the underside of the handle.

4. An operating handle for an electrically driven tool comprising, a handle tube and an associated hollow hand grip having a portion which is received in the end of said tube, a switch inside said hand grip having an operating member projecting from an opening located in the top of the hand grip, means for securing said hand grip to said tube, an electric cord operatively connected to said switch, a strain relief integral with the cord received in an opening at the underside of the handle, and means in the form of a notched collar inside the handle engaging said strain relief for securely attaching the same with respect to the handle.

5. An operating handle for an electrically driven tool comprising, a handle tube and an associated hollow hand grip having a portion which is received in the end of said tube, a switch in said hand grip having an operating member projecting from an opening located in the underside of the tube and hand grip, means for securing said hand grip to said tube, an electric cord operatively connected to said switch, a strain relief integral with the cord received in an opening at the underside of the handle, and means inside the handle pivotally connected to said switch and engaging said strain relief for securely attaching the same with respect to the handle.

6. An operating handle for an electrically driven tool comprising, a handle tube and an associated hollow and grip having a portion which is received in the end of said tube, a switch in said hand grip having an operating member projecting from an opening located in the underside of the tube and hand grip, an electric cord operatively connected to said switch, a strain relief integral with the cord received in an opening at the underside of the handle, and means inside the handle operatively connected to said switch engaging said strain relief and the inner surface of said handle tube with a wedging action for securely attaching the hand grip and the strain relief with respect to the handle tube.

WALTER A. FRANTZ.